United States Patent [19]

Schlosser et al.

[11] Patent Number: 4,790,278

[45] Date of Patent: Dec. 13, 1988

[54] CENTRIFUGAL AXLE SPEED GOVERNOR

[75] Inventors: Kraig J. Schlosser, Auburn; Howard W. Reaser, Fort Wayne, both of Ind.

[73] Assignee: Dana Corporation, Toledo, Ohio

[21] Appl. No.: 940,872

[22] Filed: Dec. 10, 1986

[51] Int. Cl.⁴ .......................... F02D 11/04; G01P 3/18
[52] U.S. Cl. ...................................... 123/376; 73/535; 73/551
[58] Field of Search ................. 73/535, 539, 544, 548, 73/550, 551; 123/363, 376

[56] References Cited

U.S. PATENT DOCUMENTS

| | | |
|---|---|---|
| 1,257,918 | 2/1918 | Noack . |
| 1,777,354 | 10/1930 | Dina . |
| 2,053,514 | 9/1936 | Broders ............................ 73/551 X |
| 2,253,634 | 8/1941 | Mack ................... 73/551 X |
| 2,518,478 | 8/1950 | Kohl .................... 73/551 X |
| 2,730,350 | 1/1956 | Fisher et al. . |
| 2,945,547 | 7/1960 | Bunker ............................ 123/363 X |
| 3,461,988 | 8/1969 | Jacobson ........................ 123/363 X |
| 4,123,942 | 11/1978 | Rumyantsev ........................ 73/535 |
| 4,304,202 | 12/1981 | Schofield ........................ 123/376 X |

FOREIGN PATENT DOCUMENTS 468870 11/1928 Fed. Rep. of Germany ........ 73/551
201069 7/1923 United Kingdom .................. 73/551

Primary Examiner—Tony M. Argenbright
Assistant Examiner—Eric R. Carlberg
Attorney, Agent, or Firm—F. B. McDonald

[57] ABSTRACT

A reduction gear axle apparatus includes a differential gearing assembly positioned for driving a pair of coaxially arranged driving axle shafts. The apparatus includes a rotary input shaft disposed for coupling with a prime mover having a power modulating device. A centrifugal speed control governor is fixed to the input shaft, and the governor is operatively connected to the power modulating device for control thereof as a function of axle shaft speed. In one preferred form, the governor comprises a pair of plates with a plurality of slide weights circumferentially spaced about the plates. One of the plates is fixed to the input shaft while the other is slideable thereon. At least one plate contains cam surfaces wherein as the weights are centrifugally urged outwardly of the input shaft axis, the slideable plate is axially moved away from the fixed plate. This action causes an actuator arm to rotate, which effects control of the modulating device which is fixed through a spring to an external linkage assembly.

1 Claim, 4 Drawing Sheets

CENTRIFUGAL AXLE SPEED GOVERNOR

BACKGROUND OF THE INVENTION

This invention relates to speed control devices fixed to rotating shafts incorporated in vehicular assemblies. More particularly, this invention relates to centrifugal speed governors.

In the prior art, most speed governors have been of a type wherein throttle control is regulated directly by engine speed. Such systems have not been fully responsive to the loads and variations in driving conditions associated with certain off-road vehicles such as golf cars. For example, where variable ratio transmission systems have been employed, such as pulley drives, control based upon engine speed is ineffective. Under the latter conditions, control must be modulated on the basis of axle speed, the direct object of intended control, as contrasted to engine speed.

Several systems have in fact incorporated direct axle speed governor devices. However most of those have been deficient, particularly in requirements of space. For example, flyweights have been incorporated in several of such systems, resulting in bulkier axle profiles which are generally not suitable for today's streamlined vehicular packaging.

SUMMARY OF THE INVENTION

The axle apparatus of the present invention incorporates a speed governor system which is compact as well as effective in controlling axle speed in lieu of engine speed in golf car vehicles. In one preferred form, the axle apparatus includes a differential reduction gear assembly positioned for driving a pair of coaxially arranged driving axle shafts. The axle apparatus includes a rotary input shaft disposed for coupling to a prime mover, the prime mover including a power modulating device. A speed control governor is affixed to the input shaft, and the governor is operatively connected to the power modulating device for effecting axle speed control.

In the later preferred form, the centrifugal governor of the present invention includes a pair of annular plates, one of which is fixed to the rotary input shaft, the other of which is axially slideable along the input shaft relative to the first. A plurality of ball weights are interposed between the plates, which include cam surfaces. When subject to centrifugal forces during input shaft rotation, the weights move radially outwardly, and will force the axially slideable plate away from the fixed plate. The slideable plate is axially interposed between a compression spring and the fixed plate, wherein the centrifugal force of the weights against the cam surfaces of the slideable plate will only move the slideable plate if and to the extent that the compression spring forces are overcome. Upon the slowing down or stopping of the input shaft, the centrifugal forces on the weights become low to nonexistent, and the compression spring will close the plates fully together, and force the weights into their radially innermost positions adjacent the input shaft. In the same preferred form, the plates rotate with each other and are coupled together radially by a unique tang and slot system which permits the fixed plate to rotate the slideable plate.

Finally, in the same preferred form, a bearing or wear surface is disposed on the bottom of the slideable plate for engagement with the contact end of an actuator arm which is rotated by movement of the slideable plate. The actuator arm is directly connected to the power modulating device through an external linkage assembly, which includes a spring for purposes that include ensuring contact between the actuator arm and the wear surface of the slideable plate.

DETAILED DESCRIPTION OF THE PREFERRED EMBODIMENTS

Figure 1:
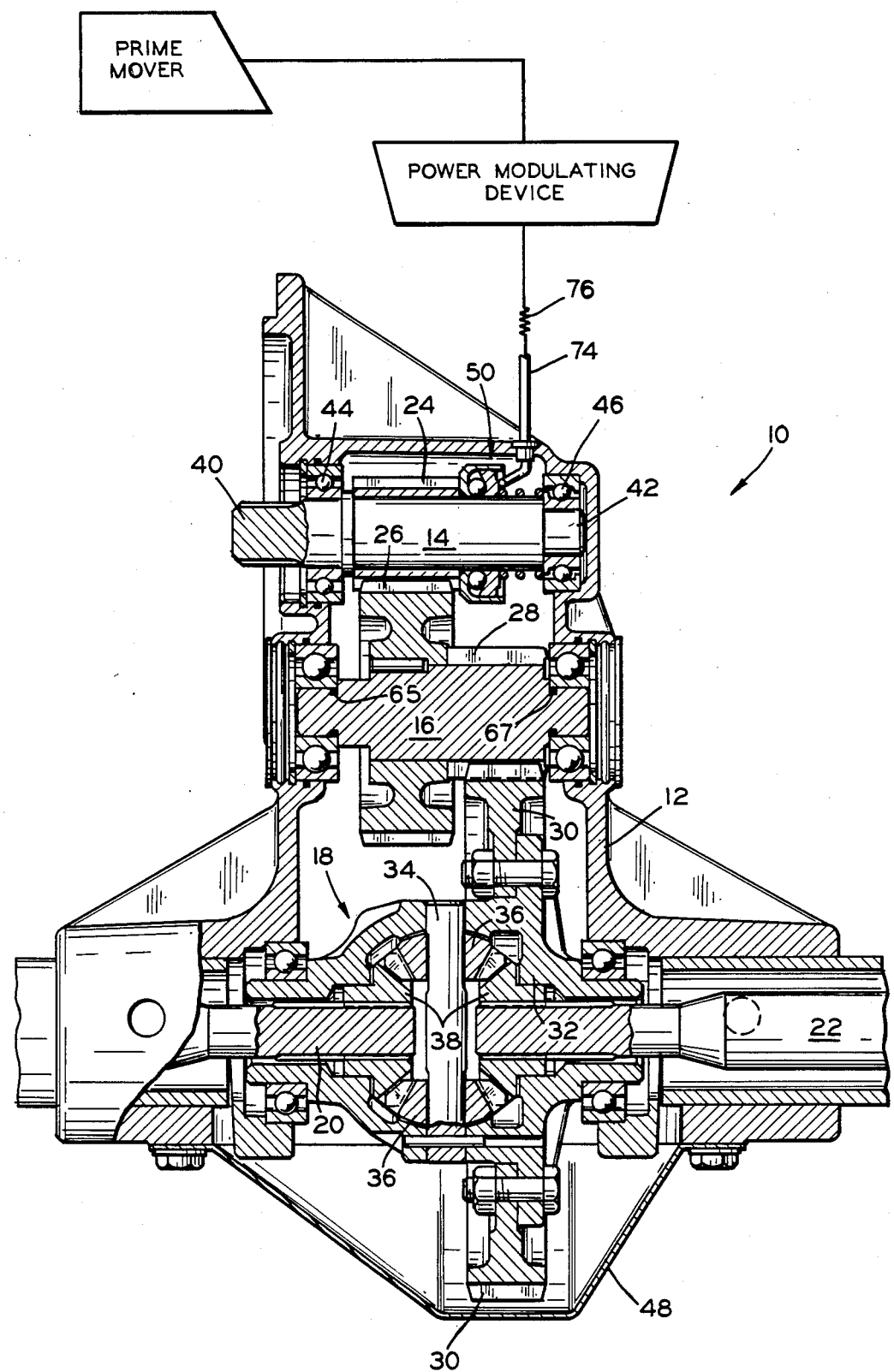
FIG. 1 is a cross-sectional view of a reduction gear axle apparatus which includes the centrifugal axle speed governor of the present invention.

A reduction gear axle apparatus 10 of the type associated with self-propelled golf cars is shown in FIG. 1. The apparatus 10 includes a housing 12 which holds in parallel arrangement an input shaft 14, a reduction shaft 16, and a differential assembly 18. The housing 12 is preferably formed of an aluminum alloy for the purpose of lightness of weight. Splined to the differential assembly 18 are a left axle shaft 20 and a right axle shaft 22 for transmission of rotary power to the wheels of a small vehicle (not shown), such as, for example, a golf car.

In the presently preferred embodiment, an input gear 24 is driven by a prime mover (shown schematically), preferably a small internal combustion engine, which is coupled to the left end 40 of the input shaft 14. The input gear 24 is fixedly secured to the input shaft 14 so as to rotate therewith. In one preferred form, the input gear 24 is, in fact, integral with the shaft 14. The gear 24 mates with a driven reduction gear 26 which is keyed to and rotatable with the reduction shaft 16.

In the preferred form, the relative sizes of the gears 24 and 26 are such that the gear 26 has a greater diameter and hence the reduction shaft 16 rotates more slowly than the shaft 14. A reduction pinion gear 28 is integral with the reduction shaft 16. The gear 28 is in mesh with a differential drive gear 30 secured to differential case 32 of the differential assembly 18.

Rotation of the input shaft 14 is transferred through the input gear 24, the reduction driven and pinion gears 26 and 28, respectively, and then to the differential gear 30 to thereby rotate the differential case 32. This arrangement will produce conventional differential action of the left and right axle shafts 20 and 22 when the input shaft end 40 is coupled to an operative prime mover as noted. For this purpose, the differential case contains a pinion or cross shaft 34 which has a set of differential pinion gears 36 freely rotatable on the cross shaft, and in mesh with a pair of side gears 38. The side gears 38 are splined to the axle shafts 20 and 22, which are positively driven thereby.

The axle apparatus 10 includes a first preferred embodiment of a centrifugal axle speed governor 50, shown secured on the right end 42 of the input shaft 14 in FIG. 1. Placement of the centrifugal axle speed governor on the input shaft 14 enables the modulation of the engine speed as a function of axle speed, a more desireable control regulation input than that of the engine speed.

Referring now generally to FIGS. 2 through 7, one embodiment of the speed governor 50 is now particularly described.

The governor 50 includes a fixed annular plate 52, which in the preferred embodiment is positioned on the input shaft 14 against the right side 53 of the input gear 24. In coaxial placement with and disposed for constant axial registration with the fixed plate 52 is a slideable annular plate 54. Between the plates 52, 54 are ball weights 56 positioned in radially extending ball pockets 58 in the slideable plate 54, and ball pockets 64 in the fixed plate 52. The uniformly spaced pockets have their axes extending along radii of each plate. Both the fixed and slideable plates 52 and 54 have inner peripheries 60. The inner periphery 60 of the fixed plate is press-fit onto the right end 42 of the input shaft 14. The inner periphery of the slideable plate is disposed for movement axially over the end 42. The slideable plate 54 has an outer periphery 62 which is always in close registration at least in part with the inside diameter 63 of a cylindrical retention wall or apron 66 of the fixed plate 52. Comparing FIGS. 4 and 6, it will be noted that the ball pockets 64 of the fixed plate 52 are uniformly oval, while the ball pockets 58 provide tear-drop shaped cam surfaces. Each of the pockets 58 and 64 is always in contact at some point with one of the plurality of ball weights 56 (FIGS. 2 and 3).

In the preferred form, the ball weights 56 are uniformly spaced about the plates 52 and 54. The ball pockets are effective in maintaining the uniform spacing of the balls as is necessary for balance purposes, to the extent that the governor assembly 50 is subjected to relatively high rotational speeds.

Referring now particularly to FIGS. 4 through 7, it will be apparent that the fixed plate 52 contains axially extending, radially inwardly disposed, integral tangs 80, which mate with and slide in a plurality of mating slots 82 positioned about the outer periphery of the slideable plate 54. The resultant axial registration afforded by the tang and slot coupling achieves two purposes. First, the coupling, which freely accomodates the axial sliding of plate 54, ensures that the respective mating sets of ball pockets 58 and 64 will always remain radially aligned for proper ball movement. Secondly, the tang-slot arrangement permits the slideable plate to be driven or rotated by the fixed plate, regardless of the relative axial position of the slideable plate with respect to the fixed plate.

Figure 2:
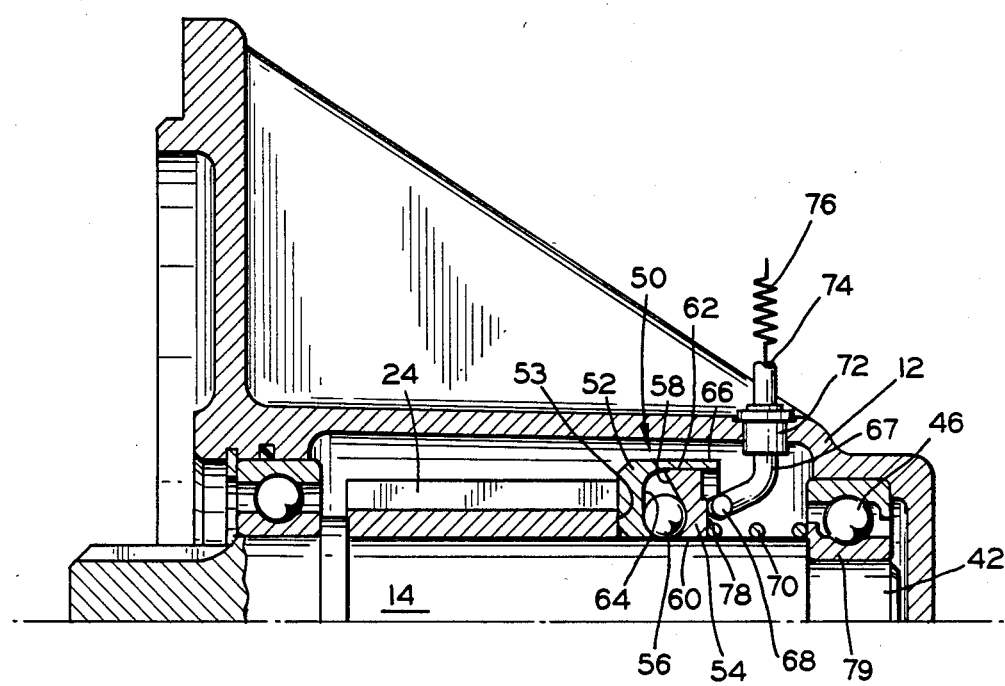
FIG. 2 is a fragmentary cross-sectional view of the centrifugal speed governor of FIG. 1 which includes the top half of the input shaft, represented in its low speed rotation or nonrotating mode.
Figure 3:
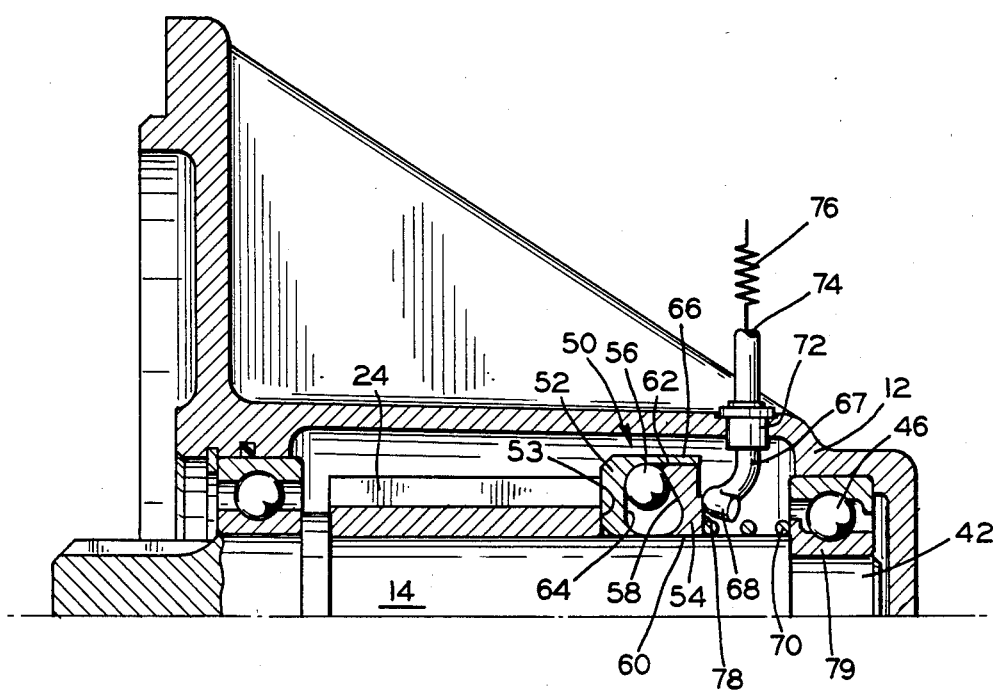
FIG. 3 is a view of the centrifugal governor as shown in FIG. 2 but represented as it would appear with the input shaft rotating under a maximum speed condition.
Figure 4:
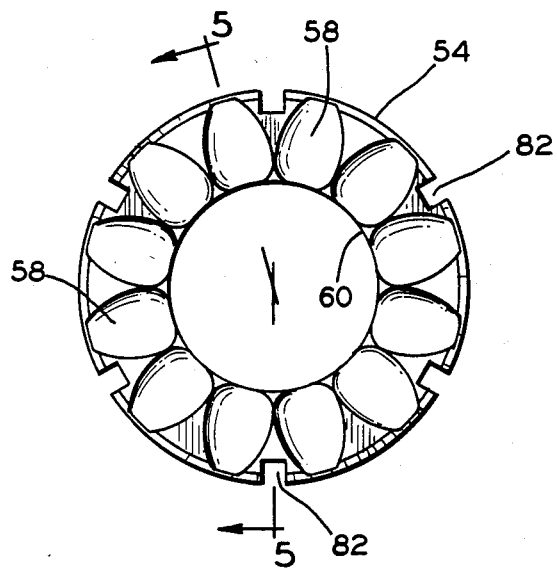
FIG. 4 is a face view of a preferred embodiment of a slideable annular plate as utilized in the speed governor of the present invention.
Figure 5:
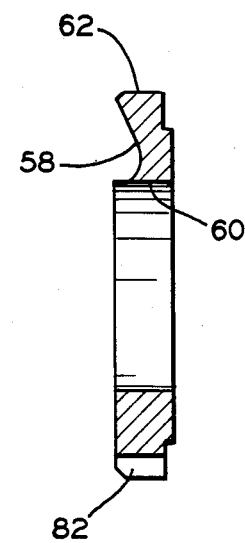
FIG. 5 is a sectional side view along lines 5—5 of FIG. 4.
Figure 6:
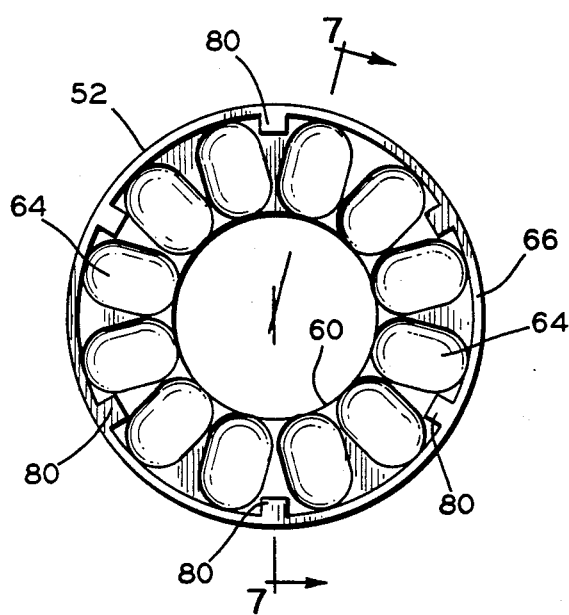
FIG. 6 is a face view of a preferred embodiment of a stationary or fixed annular plate as utilized in the speed governor of the present invention.
Figure 7:
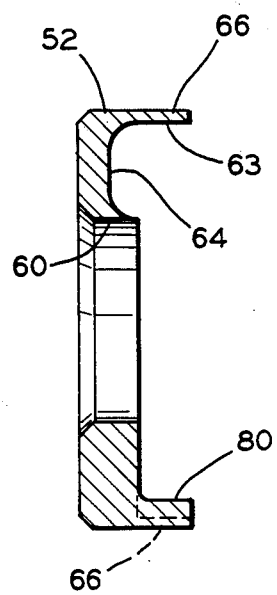
FIG. 7 is a sectional side view along line 7—7 of FIG. 6.

Referring now back to FIG. 2 and 3, an actuator arm 67 is directly connected to a power modulating device (shown schematically) which operatively raises and lowers the speed of a prime mover, such as an internal combustion engine. The actuator arm contains a contact end 68 which is in constant engagement with a wear surface 78 on the underside of the slideable plate 54. Thus as the slideable plate moves back and forth, the actuator arm is rotated about a small arc, against a tension spring force effected by a spring 76, the latter forming a part of an external power modulating linkage assembly 74. The latter linkage assembly 74 is situated externally of the housing 12, and is coupled to the actuator arm through a support bushing 72 fixed in a portion of the housing 12. The bushing 72 enables the actuator arm to pivot and hence transmit a control movement to the power modulating device via the external linkage assembly.

The operation of the speed control governor 50 may now be described as follows. It will be apparent to those skilled in the art that the rotating speed of the shaft 14 will be controlled by the speed governor 50, and that as a result, the reduction shaft 16, and in turn the driving shafts 20 and 22, will ultimately be directly controlled. The latter shafts are rotatable in a direct ratio relationship with the input shaft 14. As the input shaft 14 turns with the engine, the plates 52 and 54 of the speed governor 50 will rotate, and the centrifugal energy developed in the ball weights 56 will cause the balls to be displaced radially outwardly away from the shaft 14 from a position as shown in FIG. 2, ultimately to that shown in FIG. 3. It will also be apparent that the balls 56 will by virtue of the cam angles in the radial ball pockets 58 of the slideable plate 54 (see FIG. 5) cause the slideable plate 54 to move axially toward the right end 42 of the input shaft 14 (see FIG. 3). As the plate moves, the compression spring 70 will be displaced from its extended position of FIG. 2 to a compressed position as shown in FIG. 3, and the actuator arm 67 will rotate through a slight angle as reflected between the representations of said arm in FIGS. 2 and 3. It will also be noted that the compression spring 70 is constrained at all times between the wear surface 78 of the slideable plate 54 and the inner race 79 of the right input bearing 46. To the extent that the centrifugal energy of the ball weights will be opposed by the compression spring 70, the spring constant and compression force parameters of the spring will provide a means by which the governor may be designed to operate at predetermined speed values.

Whenever the vehicle is not moving and hence the input shaft 14 is not turning, the compression spring 70 will be effective to hold the slideable plate closed against the fixed plate (see FIG. 2). Whenever vehicular movement begins, however, the ball weights will move radially outwardly forcing the slideable plate 54 against the compression spring 70. At any given speed, the ball weights will be positioned such that the centrifugal forces on the ball and the compression spring forces (along with external linkage forces) are in balance. At a predetermined centrifugal load, the ball weights 56 will reach an extreme position as shown in FIG. 3, wherein the engine becomes unable to contribute to further increase in ground speed. Hence, the speed governor 50 will be effective to consistently hold a predetermined maximum speed as designed.

Figure 8:
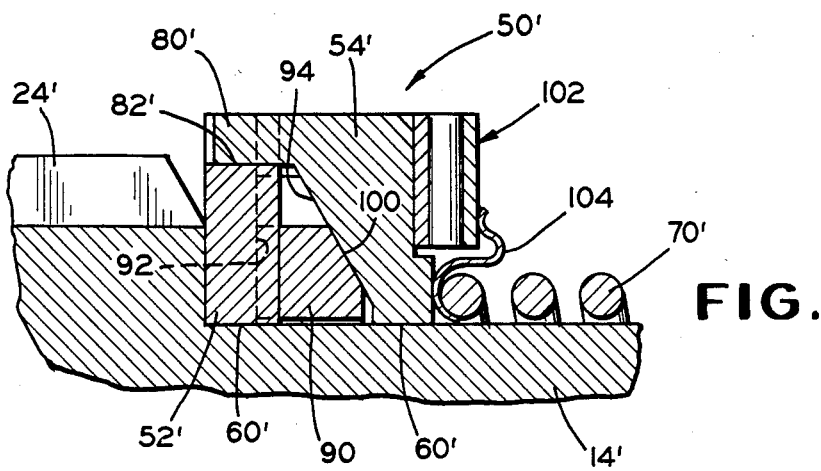
FIG. 8 is a fragmentary cross-sectional view of an alternate preferred embodiment of the centrifugal speed governor of the present invention, represented in a low speed rotation or nonrotating mode.

A second preferred embodiment of the centrifugal axle speed governor of the present invention is shown as 50' in FIG. 8. While the first preferred embodiment utilized a plurality of circumferentially disposed ball weights 56, the second preferred embodiment utilizes a plurality of circumferentially disposed slide weights 90. Thus it will be appreciated by those skilled in the art that the second preferred embodiment contains an analogous fixed plate 52' and slideable plate 54'. Also analogously, the slide weights 90 are interposed between the slideable and fixed plates.

Figure 9:
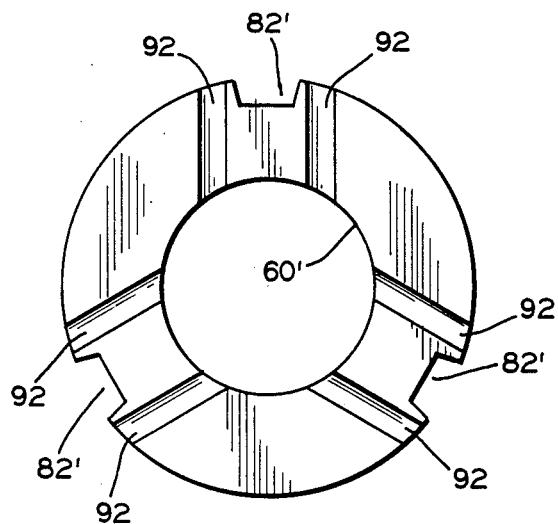
FIG. 9 is a face view of a stationary or fixed annular plate as utilized in the preferred embodiment of FIG. 8.
Figure 10:
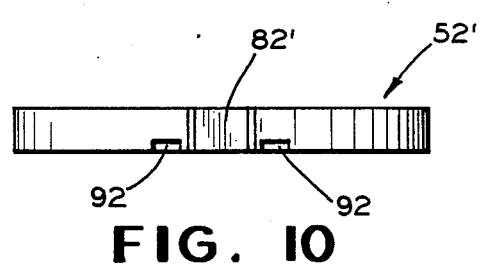
FIG. 10 is a top view of the fixed annular plate of FIG. 9.
Figure 11:
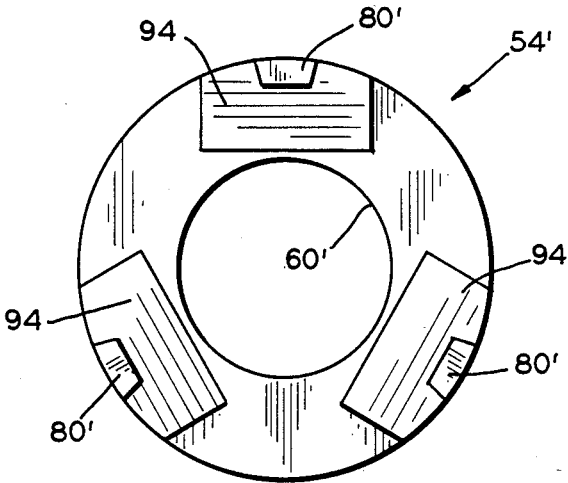
FIG. 11 is a face view of a slideable annular plate as utilized in the preferred embodiment of FIG. 8.
Figure 12:
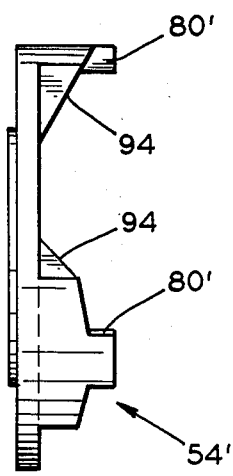
FIG. 12 is a side view of the slideable plate of FIG. 11.
Figure 13:
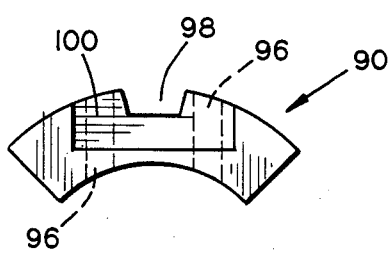
FIG. 13 is a face view of a slide weight incorporated in the preferred embodiment of FIG. 8.
Figure 14:
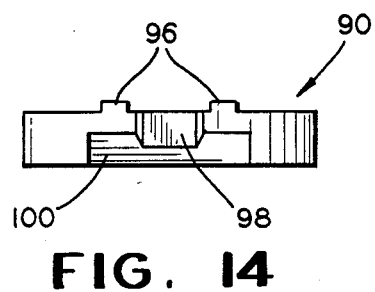
FIG. 14 is a top view of the slide weight of FIG. 13.

Referring now to FIGS. 9 through 14, the special structures of and relationships between the fixed plate 52', slideable plate 54', and slide weights 90 will now be detailed. In the second preferred embodiment, three slide weights 90 are utilized, each having a shape defined by a partial annulus as seen in FIG. 13. Each slide weight 90 incorporates three pairs of parallel slide locators 96 which are designed to move in mating sets of slide slots 92 in the fixed plate 52' (FIGS. 9 and 10). Each slideable plate 54' has a slide ramp 94 which is designed to mate with a slide cam surface 100 on each slide weight 90. Thus it will be appreciated that as the slide weights move radially outwardly under centrifugal force against the compression force of a spring 70', the slide cam surface 100 of each slide weight 90 will move along its respective slide ramp 94 and will urge the slideable plate 54' axially rightwardly (FIG. 8) against the compression spring 70'. The slide locators and respective slide slots will maintain the slide weights 90 in proper placement wth respect to the members 52' and 54' so as to avoid cocking of the slide weights 90, and to otherwise avoid imbalances which might otherwise be introduced into this rotating system. Hence the slide locator and slot system is effective to maintain the circumferential spacing and proper registration of the slide weights in a rotating centrifugally-responsive environment.

As in the first preferred embodiment, the fixed plate 5' is preferably press-fit onto the input shaft 14'. For this purpose, the inner periphery 60' of the fixed plate 52 will tightly engage the outside diameter of the input shaft 14'. However, the inner periphery 60' of the slideable plate 54' will loosely register with the outside diameter of the input shaft 14', and will hence be freely rotatable about the shaft. However, because it is desirable to have the slideable plate 54' rotate with the fixed plate 52' which is, in fact, secured to the shaft by the aforedescribed press-fit connection, a tang and slot coupling system analogous to that of the first preferred embodiment is employed. Specifically, an axially extending tang 80' will engage the axially extending slot 82 of the fixed plate 52'. It will be noted that the tang and slot carriers are reversed in the second embodiment relative to the first; that is, the tangs of the second preferred embodiment are incorporated in the slideable plate, while the slots of the second preferred embodiment are incorporated in the fixed plate. In both cases however, the tang and slot members are positioned in the outer peripheries or circumferences of respective fixed and slideable plates. Moreover, in both cases they are circumferentially and uniformly spaced about the peripheries of the latter members.

One additional feature of the tangs 80' should be noted. In the second preferred embodiment, the slide weight 90 incorporates a tang contact groove 98 which is designed to provide the outer limit of radial movement of slide weight. Thus in the second preferred embodiment the tang 80' engages the groove 98 to provide the radial limit of movement of the slide weight 90, while in the first preferred embodiment the latter limit was effected on the ball weights by virtue of the cylindrical aprons 66 of the fixed plate 52.

In all other respects, the two embodiments are similar in both design and operation.

Finally, the centrifugal axle speed governor 50' includes a thrust bearing assembly 102, which is annular in shape, and comprises a thrust bearing and a pair of thrust washers. A thrust bearing retainer 104 is interposed between the compression spring 70' and the thrust bearing assembly 102, and aids in maintaining the coaxial position of the thrust bearing with respect to the input shaft.

Although only two preferred embodiments have been shown and described herein, the following claims are envisioned to cover numerous other embodiments which fall within the spirit and scope thereof. For example, although the description makes reference only to placement of the governor on an axle input shaft, such a governor could be placed on crankshafts, or on any other rotatable shaft for which rotational speed control is desired. Moreover, each of the ball or slide weight designs could include double-sided cams; that is, a cam surface would exist on both plates (in the case of the ball weights), or a cam surface on both sides of the slide weight. Finally, the numbers of ball weights and slide weights, as appropriate, can also be varied.

What is claimed is:

1. In an axle apparatus including a rotary input shaft disposed for coupling to a prime mover, said prime mover including power modulating means; an improvement comprising said input shaft having a speed control governor fixed thereto, said governor operatively connected to said power modulating means. wherein said governor comprises a pair of annular plates, one of said plates fixed to said input shaft, the other of said plates axially slidable on said shaft, and a plurality of radially moveable weights circumferentially spaced between said plates and axially interposed therebetween, one plate including a plurality of axially extending, circumferentially spaced tangs, the other plate including a plurality of circumferentially spaced, axially extending slots, said slots matingly disposed for receiving said tangs in sliding registration as said slidable plate moves axially along said input shaft, wherein said weights comprise slide members, and wherein one of said plates defines a radially extending slide ramp for each slide member, each ramp defining a cam surface whereby as centrifugal force urges each weight radially outwardly toward the peripheries of said plates, said slidable plate is urged axially away from said fixed plate, wherein said plate containing said plurality of slide ramps further comprises an axially extending tang at the circumferential extremity of each slide ramp, wherein the other of said plates comprises pairs of parallel slide slots, each member containing mating pairs of slide locators extending radially thereon, each mating locator and slot combination providing a means for one slide member to track radially along a predetermined path as said slide member moves outwardly under centrifugal force, wherein said plate containing said slide slots further comprises a plurality of circumferentially disposed tang receiving slots disposed for registering axially with said axially extending tangs of said other plate, and wherein each slide member contains a tang contact groove disposed for engaging said tang and for limiting radially outward movement of said slide member.

* * * * *